US009678665B2

(12) United States Patent
Karamcheti et al.

(10) Patent No.: US 9,678,665 B2
(45) Date of Patent: Jun. 13, 2017

(54) METHODS AND SYSTEMS FOR MEMORY PAGE ALLOCATION

(71) Applicant: HGST Netherlands B.V., Amsterdam (NL)

(72) Inventors: Vijay Karamcheti, Palo Alto, CA (US); Ashwin Narasimha, Sunnyvale, CA (US); Ashish Singhai, Los Altos, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 36 days.

(21) Appl. No.: 14/640,944

(22) Filed: Mar. 6, 2015

(65) Prior Publication Data

US 2016/0259555 A1 Sep. 8, 2016

(51) Int. Cl.
*G06F 3/06* (2006.01)
*G06F 11/00* (2006.01)

(52) U.S. Cl.
CPC ............ *G06F 3/0604* (2013.01); *G06F 3/061* (2013.01); *G06F 3/0631* (2013.01); *G06F 3/0638* (2013.01); *G06F 3/0679* (2013.01); *G06F 3/0688* (2013.01); *G06F 11/00* (2013.01); *G06F 3/0689* (2013.01)

(58) Field of Classification Search
CPC .... G06F 3/0602; G06F 3/0631; G06F 3/0679; G06F 3/0689; G06F 11/1076; G06F 3/067; G06F 12/0246
See application file for complete search history.

(56) References Cited

U.S. PATENT DOCUMENTS 5,497,457 A * 3/1996 Ford .................. G06F 11/1076 714/15
5,758,118 A * 5/1998 Choy .................. G06F 11/1092 711/114

(Continued)

OTHER PUBLICATIONS

Baek, et al., "Design and Implementation of a Uniformity-Improving Page Allocation Scheme for Flash-Based Storage Systems," Design Automation for Embedded Systems, vol. 13, Jan. 2009, (pp. 5-25)—21 pages.

(Continued)

*Primary Examiner* — Jared Rutz
*Assistant Examiner* — Khoa D Doan
(74) *Attorney, Agent, or Firm* — McDermott Will & Emery LLP

(57) ABSTRACT

Techniques for improving memory page allocation are disclosed. In some embodiments, the techniques may be realized as a method for improving memory page allocation including generating, using a compression unit, compressed grains associated with compressed blocks, identifying a write page allocation unit to query, receiving, at the write page allocation unit, a query for a flash memory location to store the compressed grains, determining a flash memory location for the compressed grains, determining a parity location for the compressed grains, returning offsets indicating the flash memory location and the parity location, sending the compressed grains to the free grain location and a parity bit to the parity location as part of an atomic transaction, and recording a start location of compressed grains in a mapping.

22 Claims, 5 Drawing Sheets

500
502 Start
504 Generate Compressed Memory Grains
506 Identify Appropriate Write Page Allocation Unit to Query
508 Request Flash Memory Location for Grains
510 Determine Free Grain Locations
512 Determine Parity Location
514 Return offsets for Parity Location and Free Grain Location(s) and Grain Count
516 Send Data to Free Grain Locations and Parity Location in an Atomic Transaction
518 Record Start Location of Grain in Map
520 End

(56) References Cited

U.S. PATENT DOCUMENTS 6,356,701 B1* 3/2002 Tanizawa ............. G11B 27/005 348/462
7,818,525 B1* 10/2010 Frost ................... G06F 12/0246 365/185.25
8,601,347 B1 12/2013 Koseki
8,688,946 B2 4/2014 Foster et al.
9,195,530 B1* 11/2015 Jean .................... G06F 13/4027
9,329,948 B2* 5/2016 Li ....................... G06F 11/1666
2003/0188097 A1* 10/2003 Holland .............. G06F 11/1076 711/114
2006/0149999 A1* 7/2006 Hung .................. G06F 11/1084 714/6.32
2007/0136523 A1 6/2007 Bonella et al.
2007/0288692 A1* 12/2007 Bruce ..................... G06F 3/061 711/113
2009/0106585 A1* 4/2009 Kitamura ............ G06F 11/1076 714/6.13
2009/0307421 A1* 12/2009 Galloway ........... G06F 11/1076 711/114
2011/0161779 A1* 6/2011 Otsuka ................ G06F 12/0246 714/758
2012/0011337 A1* 1/2012 Aizman .............. G06F 11/1076 711/162
2012/0030425 A1* 2/2012 Becker-Szendy ... G06F 11/1076 711/114
2012/0059978 A1 3/2012 Rosenband et al.
2012/0284483 A1 11/2012 Foster et al.
2012/0331339 A1* 12/2012 Schmidt ................... G05B 9/02 714/15
2013/0246839 A1* 9/2013 Werner ................. G06F 11/108 714/6.13
2013/0268724 A1* 10/2013 Seo ..................... G06F 12/0246 711/103
2013/0290618 A1* 10/2013 Werner ............... G06F 11/1044 711/103
2014/0040531 A1* 2/2014 Wu ..................... G06F 11/1048 711/103
2014/0114936 A1* 4/2014 Araki .................... G06F 3/0608 707/693
2014/0189421 A1* 7/2014 Werner ............... G06F 11/2056 714/6.21
2014/0208007 A1 7/2014 Cohen et al.
2014/0281265 A1* 9/2014 Atkisson ............. G06F 12/0802 711/136
2014/0304560 A1* 10/2014 Narasimha .......... G06F 11/0727 714/704
2014/0317340 A1* 10/2014 Nishina ................. G06F 3/0608 711/103
2015/0058547 A1* 2/2015 Thatcher ............... G06F 3/0604 711/103
2016/0004642 A1* 1/2016 Sugimoto ................. G06F 3/06 711/128

OTHER PUBLICATIONS

Wu, et al., "A File System for Storage Class Memory," Department of Electrical and Computer Engineering, Texas A&M University, Feb. 2011, 2 pages.

* cited by examiner

| $S_{000}$ | $S_{100}$ | $S_{200}$ | $S_{300}$ | $S_{400}$ | $S_{500}$ | $S_{010}$ | $S_{020}$ |
|---|---|---|---|---|---|---|---|
| A0 | A1 | A2 | A3 | A4 | A5 | A6 | $XOR_{A06}$ |
| B0 | B1 | B2 | B3 | B4 | B5 | $XOR_{B06}$ | B6 |
| C0 | C1 | C2 | C3 | C4 | $XOR_{C06}$ | C5 | C6 |
| D0 | D1 | D2 | D3 | $XOR_{D06}$ | D4 | D5 | D6 |
| E0 | E1 | E2 | $XOR_{E06}$ | E3 | E4 | E5 | E6 |
| F0 | F1 | $XOR_{F06}$ | F2 | F3 | F4 | F5 | F6 |
| G0 | $XOR_{G06}$ | G1 | G2 | G3 | G4 | G5 | G6 |
| $XOR_{H06}$ | H0 | H1 | H2 | H3 | H4 | H5 | H6 |

| $S_{000}$ | $S_{100}$ | $S_{200}$ | $S_{300}$ | $S_{400}$ | $S_{500}$ | $S_{010}$ | $S_{020}$ |
|---|---|---|---|---|---|---|---|
| A0 | A1 | A2 | A3 | A4 | A5 | A6 | H6 |
| B0 | B1 | B2 | B3 | B4 | B5 | H5 | B6 |
| C0 | C1 | C2 | C3 | C4 | H4 | C5 | C6 |
| D0 | D1 | D2 | D3 | H3 | D4 | D5 | D6 |
| E0 | E1 | E2 | H2 | E3 | E4 | E5 | E6 |
| F0 | F1 | H1 | F2 | F3 | F4 | F5 | F6 |
| G0 | H0 | G1 | G2 | G3 | G4 | G5 | G6 |
| $XOR_{H06}$ | $XOR_{G06}$ | $XOR_{F06}$ | $XOR_{E06}$ | $XOR_{D06}$ | $XOR_{C06}$ | $XOR_{B06}$ | $XOR_{A06}$ |

METHODS AND SYSTEMS FOR MEMORY PAGE ALLOCATION

BACKGROUND

A high performance non-volatile storage class memory subsystem Solid State Device (SSD) architecture may include an indirection system that maps the Logical Block Address (LBA) seen by the host to the Physical Block Number (PBN) or physical address seen by the non-volatile storage media. In some embodiments, an indirection table may be implemented utilizing host resources (e.g., DRAM and CPU). In such embodiments, the system running on the host is responsible for mapping the LBA to a PBN that the non-volatile memory storage system can use. It may use an established mapping between the logical block and the physical block layout. However, when compression is introduced into the data path, standard indirection mapping the LBA to a PBN will not work. Specifically, with compression the number of non-volatile storage blocks that the Logical Block will use is changed. This implies that the host has no apriori knowledge of how many PBNs it needs to allocate for a particular LBA.

SUMMARY OF THE DISCLOSURE

Techniques for improving memory page allocation are disclosed. In some embodiments, the techniques may be realized as a method for improving memory page allocation including generating, using a compression unit, compressed grains associated with compressed blocks, identifying a write page allocation unit to query, receiving, at the write page allocation unit, a query for a flash memory location to store the compressed grains, determining a flash memory location for the compressed grains, determining a parity location for the compressed grains, returning offsets indicating the flash memory location and the parity location, sending the compressed grains to the free grain location and a parity bit to the parity location as part of an atomic transaction, and recording a start location of compressed grains in a mapping.

In accordance with additional aspects of this embodiment, the compression unit may identify the write page allocation unit to query.

In accordance with further aspects of this embodiment, the write page allocation unit may be identified based at least in part on a type of block currently being compressed by the compression unit.

In accordance with other aspects of this embodiment, the type of block may include at least one of: a block associated with host traffic, a block associated with Solid State Device (SSD) controller administrative traffic, and a block associated with storage infrastructure traffic.

In accordance with additional aspects of this embodiment, the determined flash memory location for the compressed grains may include a flash memory channel SRAM buffer location.

In accordance with further aspects of this embodiment, calculating the parity bit for the compressed grains may use an XOR parity scheme.

In accordance with other aspects of this embodiment, determining a parity location for the compressed grains may include identifying a flash memory channel SRAM buffer location.

In accordance with additional aspects of this embodiment, determining the flash memory location for the compressed grains may include identifying a flash memory line.

In accordance with further aspects of this embodiment, determining the flash memory location for the compressed grains may include identifying a memory die of the identified flash memory line.

In accordance with other aspects of this embodiment, determining the flash memory location for the compressed grains may include at least one of tracking free grains in flash memory and tracking unavailable flash memory.

In accordance with additional aspects of this embodiment, determining a parity location for the compressed grains may include aligning one or more parity blocks at an end of a flash page associated with the compressed grains.

In other embodiments, the techniques may be realized as a computer program product including a series of instructions executable on a computer. The computer program product may perform a process for improving memory page allocation. The computer program may implement the steps of generating, using a compression unit, compressed grains associated with compressed blocks, identifying a write page allocation unit to query, receiving, at the write page allocation unit, a query for a flash memory location to store the compressed grains, determining a flash memory location for the compressed grains, determining a parity location for the compressed grains, returning offsets indicating the flash memory location and the parity location, sending the compressed grains to the free grain location and a parity bit to the parity location as part of an atomic transaction, and recording a start location of compressed grains in a mapping.

In yet other embodiments, the techniques may be realized as a system for improving memory page allocation. The system may include a storage media device, a PCIe-based device controller associated with the storage media device. The PCIe-based device controller may be configured to: generate, using a compression unit, compressed grains associated with compressed blocks, identify a write page allocation unit to query, receive, at the write page allocation unit, a query for a flash memory location to store the compressed grains, determine a flash memory location for the compressed grains, determine a parity location for the compressed grains, return offsets indicating the flash memory location and the parity location, send the compressed grains to the free grain location and a parity bit to the parity location as part of an atomic transaction, and record a start location of compressed grains in a mapping.

In accordance with additional aspects of this embodiment, the compression unit may identify the write page allocation unit to query.

In accordance with further aspects of this embodiment, the write page allocation unit may be identified based at least in part on a type of block currently being compressed by the compression unit.

In accordance with other aspects of this embodiment, the type of block may include at least one of: a block associated with host traffic, a block associated with Solid State Device (SSD) controller administrative traffic, and infrastructure traffic.

In accordance with additional aspects of this embodiment, the determined flash memory location for the compressed grains may comprise a flash memory channel SRAM buffer location.

In accordance with further aspects of this embodiment, calculating the parity bit for the compressed grains may use an XOR parity scheme.

In accordance with other aspects of this embodiment, determining a parity location for the compressed grains may include identifying a flash memory channel SRAM buffer location.

In accordance with additional aspects of this embodiment, determining the flash memory location for the compressed grains may include identifying a flash memory line.

In accordance with further aspects of this embodiment, determining the flash memory location for the compressed grains may include identifying a memory die of the identified flash memory line.

In accordance with other aspects of this embodiment, determining a parity location for the compressed grains may include aligning one or more parity blocks at an end of a flash page associated with the compressed grains.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

FIG. 3 depicts a data structure mapping a memory page allocation of storage grains and associated parity bits, in accordance with an embodiment of the present disclosure.

FIG. 4 depicts a data structure mapping a memory page allocation of storage grains and associated parity bits, in accordance with an embodiment of the present disclosure.

DESCRIPTION

Figure 1:
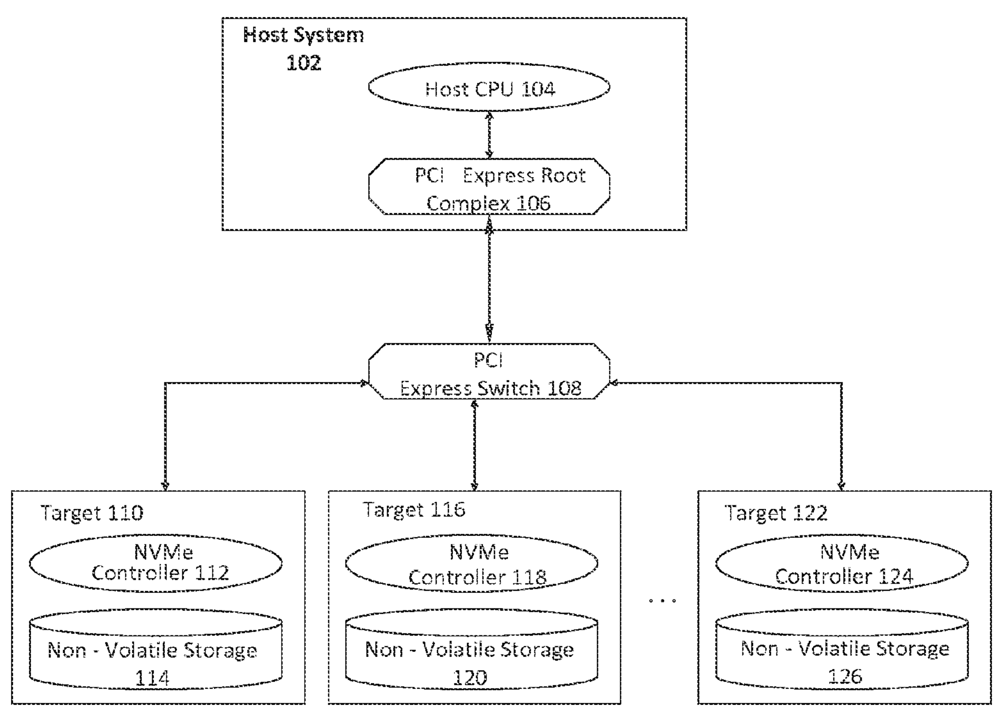
FIG. 1 shows a block diagram depicting a plurality of PCIe devices in communication with a host device, in accordance with an embodiment of the present disclosure.

The present disclosure relates to techniques for improving memory page allocation for Solid State Devices (SSDs). Embodiments of the present disclosure may use hardware as well as software to assist an indirection system of a Solid State Storage device to accommodate compression into a data path. Additionally parity (e.g., XOR) data routing may be optimized to improve RAID performance and device bus utilization. Embodiments of the disclosure also describe a write path used in high performance PCIe attached Storage Class Memory (SCM) non-volatile storage sub-systems.

Introducing compression into a data path may include modifications to indirection data structures, hardware, and/or logic. Specifically, with compression a number of non-volatile storage blocks that a Logical Block may use may be changed. Thus a host has no prior knowledge of how many Physical Block Numbers (PBNs) it needs to allocate for a particular LBA. Embodiments of the present disclosure allow a restructuring of data to map LBAs to PBNs in a context using compressed data.

Additionally, enterprise grade storage may require RAID like (e.g., XOR parity, Low-density parity check (LDPC), Bose Chaudhuri Hocquenghem (BCH), or other error corrections) protection. Furthermore, power safety requirements may exist in order to ensure correctness of data. A two stage approach with atomic power safe commit guarantees may be used. Because of a compression stage in the write path, compressed output may be handled in a power safe manner. Once data is in a compression unit, it may be guaranteed that the data will be committed on power cut and that the RAID (e.g., XOR parity) computation will be an atomic operation as well.

According to embodiments of the disclosure, a Write Page Allocator (WPA) may facilitate or provide the guarantee of an atomic operation (e.g., by simulcasting the data to two different flash channel SRAM locations). In some embodiments, a first flash channel may be used for the data storage and a second flash channel may be used for RAID (e.g., XOR parity) storage. A parity storage location may do an inline read-modify write to store a new updated parity.

An indirection system for a high performance storage class memory subsystem may maintain a mapping from each logical block to a particular physical block on the storage media. A write page allocator may allow this mapping to accommodate compression. In some embodiments, the smallest compression granularity may be quantized into a unit called a grain. Typically an integral number of grains make up an Error Correcting Code (ECC) protected code word.

In some embodiments, a write page allocator may track a number of grains available in a flash memory die, a flash memory line, or other SSD component. A write page allocator may also track defects or problems with a flash memory die, a flash memory line, or another disabled or damaged flash memory component. Tracking unavailable flash memory components may allow a write page allocator to more accurately track and map flash memory space available for grains.

A physical channel or line may provide access to one flash memory die (for either a read or a write Input/Output request) at a time. In some embodiments, a write page allocator may also facilitate distribution of write across multiple flash memory lines or physical channels to reduce congestion and/or latency, to distribute wear, or for other purposes. A SSD may have multiple physical flash channels and each physical flash channel may provide access to multiple flash memory dies (e.g., 4 dies, 8 dies, etc.). Some flash memory dies may have multiple memory arrays or planes and may be capable of performing multiple operations simultaneously. An SSD may have multiple physical channels (e.g., 4-32) and several physical channels may be grouped to form a logical channel. Logical channels may be further grouped. Free or empty pages associated with one or more memory dies may be tracked.

Turning now to the drawings, FIG. 1 is a block diagram depicting a PCIe device in communication with a host device, in accordance with an embodiment of the present disclosure. FIG. 1 includes a number of computing technologies such as a host system 102, host CPU 104, and PCI express root complex 106. PCI express switch 108 may communicatively couple a plurality of targets (e.g., PCIe devices such as NVMe based targets) such as Targets 110, 116 and 122 to host system 102 via PCI express root complex 106.

Target 110 may contain NVMe controller 112 and non-volatile storage 114. Target 116 may contain NVMe controller 118 and non-volatile storage 120. Target 122 may contain NVMe controller 124 and non-volatile storage 126.

Memory based resources may be accessible to Host System 102 via a memory interface (e.g., double data rate type three synchronous dynamic random access memory (DDR3 SDRAM)). Memory can take any suitable form, such as, but not limited to, a solid-state memory (e.g., flash memory, or solid state device (SSD)), optical memory, and magnetic memory.

According to some embodiments, interfaces standards other than PCIe may be used for one or more portions including, but not limited to, Serial Advanced Technology Attachment (SATA), Advanced Technology Attachment (ATA), Small Computer System Interface (SCSI), PCI-extended (PCI-X), Fibre Channel, Serial Attached SCSI (SAS), Secure Digital (SD), Embedded Multi-Media Card (EMMC), and Universal Flash Storage (UFS).

The host system 102 can take any suitable form, such as, but not limited to, an enterprise server, a database host, a workstation, a personal computer, a mobile phone, a game device, a personal digital assistant (PDA), an email/text messaging device, a digital camera, a digital media (e.g., MP3) player, a GPS navigation device, and a TV system.

The host system 102 and the target device can include additional components, which are not shown in FIG. 1 to simplify the drawing. Also, in some embodiments, not all of the components shown are present. Further, the various controllers, blocks, and interfaces can be implemented in any suitable fashion. For example, a controller can take the form of one or more of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example.

Figure 2:
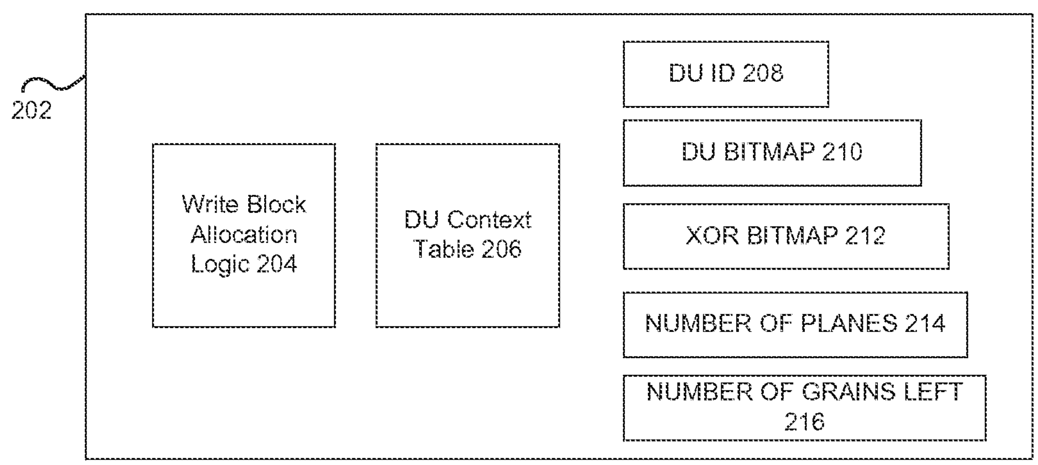
FIG. 2 depicts a block diagram illustrating a system for improving memory page allocation in accordance with an embodiment of the present disclosure.

FIG. 2 depicts a block diagram illustrating a system for improving memory page allocation in accordance with an embodiment of the present disclosure. As illustrated in FIG. 2, write page allocation unit 202 may include one or more components. Components may be hardware (e.g., dedicated circuitry), firmware, software, or a combination of the foregoing. As illustrated in FIG. 2, a write page allocation unit may include a write block allocation logic 204 which may include hardware, firmware, and/or software containing logic for write page allocation. Write block allocation logic 204 may contain logic allowing restructuring of data to align logical blocks into compressed grains and to map compressed grains to physical block in the flash storage media. DU context table 206 may include hardware, firmware, and/or software providing a correspondence between logical blocks and physical Device Units (DU) (e.g., flash memory dies, flash memory channels or lines, etc.). Write block allocation logic 204 may use data stored in DU context table 206, DU ID 206, DU bitmap 210, XOR bitmap 212, number of planes 214, number of grains left 216, and/or other hardware, firmware, and/or software. In some embodiments, DU ID 206 may include hardware, firmware, and/or software containing tracking an ID of a current device unit to which compressed grains are being assigned (e.g., an ID or a pointer referring to a flash memory line or a group of flash memory die). DU bitmap 210 may include hardware, firmware, and/or software containing for tracking flash memory storage availability on one or more device units. According to some embodiments, XOR bitmap 212 may include hardware, firmware, and/or software containing information about stored parity bits and/or availability of storage for parity bits (e.g., XOR parity, Low-density parity check (LDPC), Bose Chaudhuri Hocquenghem (BCH), or other error correction). In some embodiments, number of planes 214 may include hardware, firmware, and/or software containing an indication of a number of planes or arrays associated with one or more flash memory dies. Number of grains left 216 may include hardware, firmware, and/or software containing an indication of available flash memory storage. In some embodiments, different units other than grains may be used or an indication may be provided in terms of an amount of memory unavailable or used.

In one or more embodiments, a write page allocation unit may contain and/or interface with a compression unit. A compression unit may take the form of one or more of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. A compression unit may generate one or more compressed grains. A smallest unit of compression granularity may be a compressed grain. A smallest unit of compression granularity may be determined by a flash media, a compression unit, and/or other factors.

In some embodiments, a compression unit may determine an appropriate Write Page Allocation Unit (WPA) to query to identify available grains of flash memory for storage of compressed grains. Determination of which write page allocator to query may be based on one or more factors. In some embodiments, it may be based on a type of block that the compression unit is working on. For example, a block associated with host data traffic may prompt querying of a WPA associated with host data traffic. A block associated with Solid State Device (SSD) controller administrative traffic may prompt querying of a WPA associated with SSD controller administrative traffic and a block associated with storage infrastructure traffic may prompt querying of a WPA associated with storage infrastructure traffic. According to some embodiments, each write block may be associated with a particular active WPA unit. There may be a dedicated WPA unit for each parallel write context that is active in a system. Once the WPA is identified, a request may be made for a flash memory location for the compressed grains (e.g., a SRAM location in a flash channel SRAM buffer).

After a WPA is identified a WPA may receive a request for allocation of grains of flash memory storage (e.g., from the compression unit that contains the unit ID and the number of grains it needs to allocate). The WPA may maintain indicators (e.g., pointers) that allow it to determine a current fill location for one or more columns in an active write device unit (e.g., a flash memory line or a group of flash memory die). A WPA may also be aware of the number of free grain locations in each column, the total number of grain locations, and/or the number of used or unavailable grain locations. A WPA may determine which column (e.g., portion of flash memory storage) new grains may be allocated to. At the same time or at a different time, a WPA may also determine a location or locations to send data for generation of a parity bit and/or storage of a parity bit or other error correcting code (e.g., a resource location to XOR data). Once the allocated grains are identified and the location of parity storage is identified, a WPA may return two identifiers (e.g., SRAM offsets) to the appropriate compression unit (e.g., based on an ID or indicator provided with a grain allocation request). A compression unit may use the two indicators to send the data to both locations (e.g., the allocated grains for data storage as well as XOR parity storage). In some embodiments, a WPA may further records a start location for a first grain and may returns the start location (e.g., as an offset) to one or more components (e.g., a CPU of a host, write block allocation logic 204, etc.) so that a mapping may be updated with the actual physical address of the data.

According to one or more embodiments, a WPA may support a variety of parity or erasure coding schemes (e.g., a 16:1 ratio XOR scheme, a 6:2 XOR, or a more complex RAID or erasure coding scheme).

A WPA may track not only available or used storage, but also the functionality of such flash memory storage. For example, a WPA may track some columns (e.g., flash memory lines) which may have no grains that can be used for storage. This may occur, for example, when some dice in a write unit have a bad block (e.g., an erase block that has errors). The WPA may skip the column (e.g., flash memory line) since it may not have any open slots for the grains.

FIG. 3 depicts a data structure mapping a memory page allocation of storage grains and associated parity bits, in accordance with an embodiment of the present disclosure. Table 302 illustrates a RAID (e.g., XOR parity) data layout. Each column (e.g., S000, S100, S200, S300, S400, S500, S010, and S020) may represent an independent failure unit (e.g., a device unit or a flash memory line). Along a diagonal from the lower left to the upper right are exemplary parity storage locations for each of the rows (e.g., $XOR_{H06}$, $XOR_{G06}$, $XOR_{EO6}$, $XOR_{D06}$, $XOR_{CO6}$, $XOR_{B06}$, and $XOR_{A06}$). Parity may computed on all the blocks in the same row (e.g., $XOR_{H06}$. may be a parity bit corresponding to the data in H0-H6, $XOR_{G06}$ may be a parity bit corresponding to the data in G0-G6, etc.).

According to one or more embodiments, in order to balance the traffic to each of the columns parity (e.g., an XOR parity bit) may be distributed amongst a plurality of them. A WPA may maintain knowledge of the XOR parity locations on a per column basis or on another basis so as to support multiple data layouts within the write unit.

FIG. 4 depicts a data structure mapping a memory page allocation of storage grains and associated parity bits, in accordance with an embodiment of the present disclosure. As illustrated table 402 may represent a RAID data layout after a transform is applied. As a result the parity blocks may be concentrated at the bottom of the page (or aligned in another row). This may allow a flat allocation region for data blocks and may simplify write page allocation logic significantly.

In some embodiments, to shift a parity bit, a transformation that maintains the distribution of XOR parity locations within the combined write group but puts them all at the end of the particular write page they reside in may be used. This may allow optimization of a hardware implementation (e.g. for Field Programmable Gate Array (FPGA) resources).

Figure 5:
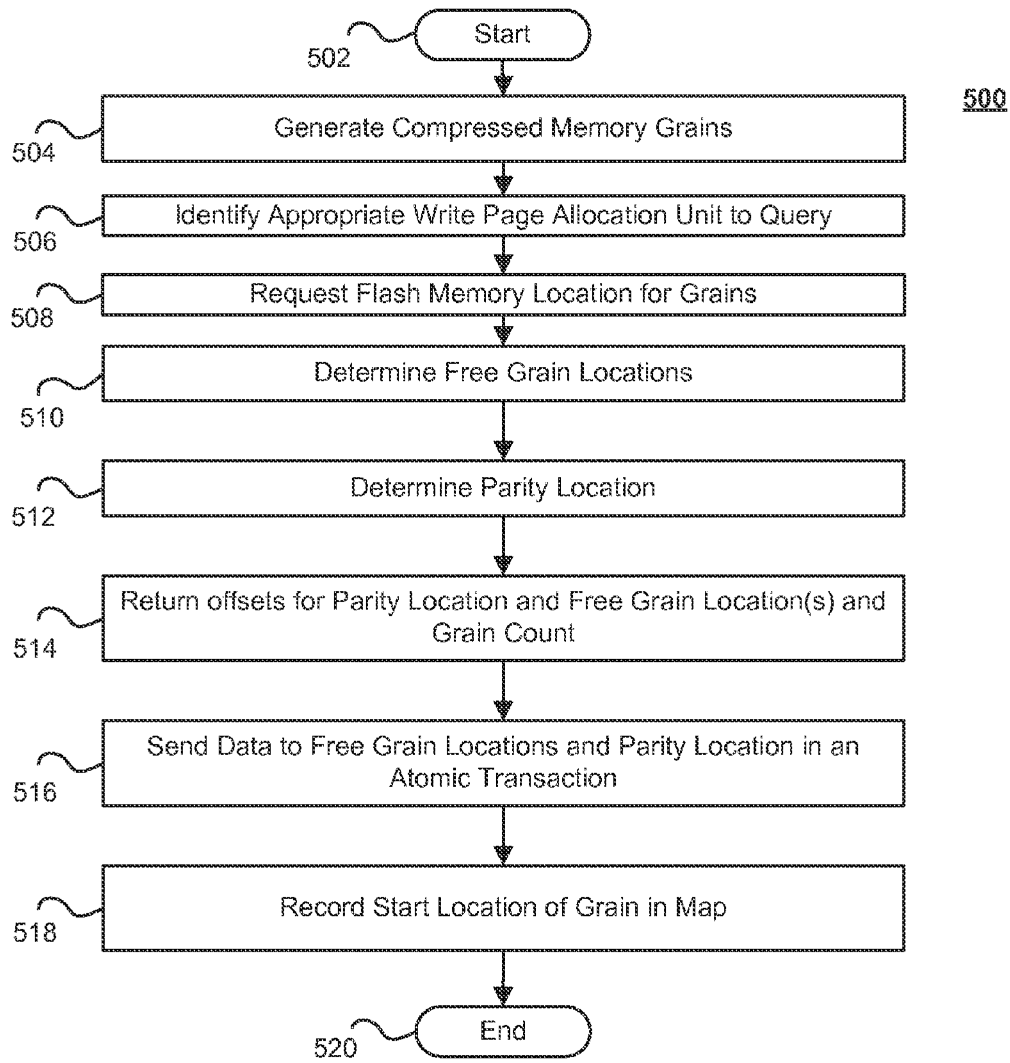
FIG. 5 depicts a flowchart illustrating a method for improving memory page allocation, in accordance with an embodiment of the present disclosure.

FIG. 5 depicts a flowchart illustrating a method for improving memory page allocation, in accordance with an embodiment of the present disclosure. The process 500, however, is exemplary only. The process 500 can be altered, e.g., by having stages added, changed, removed, or rearranged. At stage 502, the process may begin.

At stage 504, compressed memory grains may be generated. One or more compression schemes may be utilized. Compression may be performed, for example, by one or more of a microprocessor or processor and a computer-readable medium that stores computer-readable program code (e.g., software or firmware) executable by the (micro) processor, logic gates, switches, an application specific integrated circuit (ASIC), a programmable logic controller, and an embedded microcontroller.

At stage 506 an appropriate write page allocation unit may be identified to query available grains of flash memory for storage of compressed grains. Determination of which write page allocator to query may be based on one or more factors. In some embodiments, it may be based on a type of block that the compression unit is working on. For example, a block associated with host data traffic may prompt querying of a WPA associated with host data traffic. A block associated with Solid State Device (SSD) controller administrative traffic may prompt querying of a WPA associated with SSD controller administrative traffic and a block associated with storage infrastructure traffic may prompt querying of a WPA associated with storage infrastructure traffic. According to some embodiments, each write block may be associated with a particular active WPA unit.

At stage 508, a flash memory location or slot may be requested for the compressed memory grains. A WPA may receive a request for allocation of grains of flash memory storage (e.g., from a compression unit that contains the unit ID and the number of grains it needs to allocate). The WPA may maintain indicators (e.g., pointers) that allow it to determine a current fill location for one or more columns in an active write device unit (e.g., a flash memory line or a group of flash memory die).

At stage 510, free grain locations or slots for compressed memory grains may be identified. A WPA may be aware of the number of free grain locations in each column, the total number of grain locations, and/or the number of used or unavailable grain locations. A WPA may determine which column (e.g., portion of flash memory storage) new grains may be allocated to.

At stage 512, a WPA may determine (e.g., at a same time it determines a data storage location in stage 510) a location or locations to send data for generation of a parity bit and/or storage of a parity bit or other error correcting code (e.g., a resource location to XOR data).

At stage 514, once the allocated storage is identified and the location of parity storage is identified, a WPA may return two identifiers (e.g., SRAM offsets) to the appropriate compression unit (e.g., based on an ID or indicator provided with a grain allocation request).

At stage 516, a compression unit may use the two received indicators to send the data to both locations (e.g., the allocated grains for data storage as well as XOR parity storage). According to embodiments of the disclosure, a Write Page Allocator (WPA) may facilitate or provide the guarantee of an atomic operation (e.g., by simulcasting the data to two different flash channel SRAM locations). In some embodiments, a first flash channel may be used for the data storage and a second flash channel may be used for RAID (e.g., XOR parity) storage.

At stage 518, in some embodiments, a WPA may further records a start location for a first grain and may returns the start location (e.g., as an offset) to one or more components (e.g., a CPU of a host, write block allocation logic 204, etc.) so that a mapping may be updated with the actual physical address of the data. At stage 520, the method 500 may end.

Other embodiments are within the scope and spirit of the invention. For example, the functionality described above can be implemented using software, hardware, firmware, hardwiring, or combinations of any of these. One or more computer processors operating in accordance with instructions may implement the functions associated with for improving memory page allocation in accordance with the present disclosure as described above. If such is the case, it is within the scope of the present disclosure that such instructions may be stored on one or more non-transitory processor readable storage media (e.g., a magnetic disk or other storage medium). Additionally, modules implementing functions may also be physically located at various positions, including being distributed such that portions of functions are implemented at different physical locations.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method for improving memory page allocation comprising:
- generating, using a compression unit, compressed grains associated with compressed blocks;
- identifying a write page allocation unit to query;
- receiving, at the write page allocation unit, a query for a flash memory location to store the compressed grains, wherein the query includes an indicator of the compression unit;
- determining a flash memory location for the compressed grains, wherein the flash memory location is a free grain location;
- determining a parity location for the compressed grains;
- returning offsets indicating the flash memory location and the parity location to the compression unit based on the indicator of the compression unit;
- sending, the compressed grains to the free grain location and a parity bit to the parity location as part of an atomic transaction; and
- recording a start location of compressed grains in a mapping.

2. The method of claim 1, wherein the compression unit identifies the write page allocation unit to query.

3. The method of claim 1, wherein the write page allocation unit is identified based at least in part on a type of block currently being compressed by the compression unit.

4. The method of claim 3, wherein the type of block includes at least one of: a block associated with host traffic, a block associated with Solid State Device (SSD) controller administrative traffic, and a block associated with storage infrastructure traffic.

5. The method of claim 1 wherein the determined flash memory location for the compressed grains comprises a flash memory channel SRAM buffer location.

6. The method of claim 1, comprising calculating the parity bit for the compressed grains using an XOR parity scheme.

7. The method of claim 1, wherein determining a parity location for the compressed grains comprises identifying a flash memory channel SRAM buffer location.

8. The method of claim 1, wherein determining the flash memory location for the compressed grains comprises identifying a flash memory line.

9. The method of claim 8, wherein determining the flash memory location for the compressed grains comprises identifying a memory die of the identified flash memory line.

10. The method of claim 1, wherein determining the flash memory location for the compressed grains comprises at least one of tracking free grains in flash memory and tracking unavailable flash memory.

11. The method of claim 1, wherein determining a parity location for the compressed grains comprises aligning one or more parity blocks at an end of a flash page associated with the compressed grains.

12. A non-transient computer readable medium containing program instructions executable on a computer, for causing the computer to perform a process for improving memory page allocation comprising:
- generating, using a compression unit, compressed grains associated with compressed blocks;
- identifying a write page allocation unit to query;
- receiving, at the write page allocation unit, a query for a flash memory location to store the compressed grains, wherein the query includes an indicator of the compression unit;
- determining a flash memory location for the compressed grains, wherein the flash memory location is a free grain location;
- determining a parity location for the compressed grains;
- returning offsets indicating the flash memory location and the parity location to the compression unit based on the indicator of the compression unit;
- sending the compressed grains to the free grain location and a parity bit to the parity location as part of an atomic transaction; and
- recording a start location of compressed grains in a mapping.

13. A system for improving memory page allocation, the system comprising:
- a storage media device;
- a PCIe-based device controller associated with the storage media device, wherein the PCIe-based device controller is configured to:
  - generate, using a compression unit, compressed grains associated with compressed blocks;
  - identify a write page allocation unit to query;
  - receive, at the write page allocation unit, a query for a flash memory location to store the compressed grains, wherein the query includes an indicator of the compression unit;
  - determine a flash memory location for the compressed grains, wherein the flash memory location is a free grain location;
  - determine a parity location for the compressed grains;
  - return offsets indicating the flash memory location and the parity location to the compression unit based on the indicator of the compression unit;
  - send the compressed grains to the free grain location and a parity bit to the parity location as part of an atomic transaction; and
  - record a start location of compressed grains in a mapping.

14. The system of claim 13, wherein the compression unit identifies the write page allocation unit to query.

15. The system of claim 13, wherein the write page allocation unit is identified based at least in part on a type of block currently being compressed by the compression unit.

16. The system of claim 15, wherein the type of block includes at least one of: a block associated with host traffic, a block associated with Solid State Device (SSD) controller administrative traffic, and infrastructure traffic.

17. The system of claim 13, wherein the determined flash memory location for the compressed grains comprises a flash memory channel SRAM buffer location.

18. The system of claim 13, further comprising calculating the parity bit for the compressed grains using an XOR parity scheme.

19. The system of claim 13, wherein determining a parity location for the compressed grains comprises identifying a flash memory channel SRAM buffer location.

20. The system of claim 13, wherein determining the flash memory location for the compressed grains comprises identifying a flash memory line.

21. The system of claim 20, wherein determining the flash memory location for the compressed grains comprises identifying a memory die of the identified flash memory line.

22. The system of claim 13, wherein determining a parity location for the compressed grains comprises aligning one or more parity blocks at an end of a flash page associated with the compressed grains.

* * * * *